(12) United States Patent
Hager et al.

(10) Patent No.: US 7,138,940 B2
(45) Date of Patent: Nov. 21, 2006

(54) METHOD AND SYSTEMS FOR AUTOMATIC ZERO CALIBRATION OF RADAR ALTIMETERS

(75) Inventors: James R. Hager, Golden Valley, MN (US); Glen Backes, Maple Grove, MN (US); Michael William Greenwood, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 210 days.

(21) Appl. No.: 10/896,807

(22) Filed: Jul. 22, 2004

(65) Prior Publication Data

US 2006/0017609 A1 Jan. 26, 2006

(51) Int. Cl.
*G01S 7/40* (2006.01)

(52) U.S. Cl. .................. 342/174; 342/120; 342/121

(58) Field of Classification Search ........ 342/120–122, 342/173, 174
See application file for complete search history.

(56) References Cited

U.S. PATENT DOCUMENTS

| | | | | |
|---|---|---|---|---|
| 5,160,933 A * | 11/1992 | Hager | ................. | 342/174 |
| 5,300,934 A | 4/1994 | Asbell et al. | | |
| H001806 H * | 10/1999 | Ammons et al. | ........... | 342/165 |
| 6,008,754 A * | 12/1999 | Roos | ................. | 342/174 |
| 6,407,697 B1 * | 6/2002 | Hager et al. | ................. | 342/120 |
| 6,509,864 B1 * | 1/2003 | Mende et al. | ................. | 342/118 |
| 6,707,417 B1 * | 3/2004 | Huettner et al. | ........... | 342/174 |
| 6,731,236 B1 * | 5/2004 | Hager et al. | ................. | 342/174 |
| 6,753,806 B1 * | 6/2004 | Hager et al. | ................. | 342/169 |
| 6,812,885 B1 * | 11/2004 | Brettner et al. | ............. | 342/173 |
| 6,992,614 B1 * | 1/2006 | Joyce | ................. | 342/122 |
| 7,075,478 B1 * | 7/2006 | Hager et al. | ................. | 342/120 |
| 2003/0176970 A1 * | 9/2003 | Lin | ................. | 701/214 |
| 2006/0017609 A1 * | 1/2006 | Hager et al. | ................. | 342/174 |
| 2006/0164295 A1 * | 7/2006 | Focke et al. | ................. | 342/174 |

OTHER PUBLICATIONS

"Absolute Calibration of Radar Altimeters: Consistency with Electromagnetic Modeling", Gérard Caudal, Emmanuel Dinnat, Jacqueline Boutin. Journal of Atmospheric and Oceanic Technology Boston:Jun. 2005. vol. 22, Iss. 6, p. 771-781.*

"A preliminary evaluation of the absolute backscatter calibration of the ERS-1 altimeter using a passive technique", Greco, B.; Castracane, P.; Pierdicca, N.; Martini, A.; Ciotti, P.; Marzano, F.S. Geoscience and Remote Sensing Symposium, 2001. IGARSS '01. IEEE 2001 International vol. 6, 2001 Ps:2772-2774.*

* cited by examiner

*Primary Examiner*—John B. Sotomayor
(74) *Attorney, Agent, or Firm*—Andrew Abeyta, Esq.; Armstrong Teasdale LLP

(57) ABSTRACT

A method for operating a radar altimeter to perform a zero altitude calibration is described. The method includes determining a difference between an altitude measured by the radar altimeter and a desired altitude indication and upon receiving a zero calibration command, subtracting the difference from an altitude output by the radar altimeter.

23 Claims, 3 Drawing Sheets

METHOD AND SYSTEMS FOR AUTOMATIC ZERO CALIBRATION OF RADAR ALTIMETERS

BACKGROUND OF THE INVENTION

This invention relates generally to calibration of radar altimeters within air vehicles, and more specifically, to methods and systems for automatic zero altitude calibration of radar altimeters.

In navigation of an aircraft, altitude accuracy is most important at low altitude levels, particularly during landing operations. Radar altimeters installed in aircraft typically provide AGL (above ground level) altitude. Typically, radar altimeters are calibrated during production to compensate for signal propagation delays specific to a particular aircraft installation. The compensation for aircraft installation signal propagation delays may include one or more of a measurement of the distance between a radar altimeter antenna and the ground when the aircraft is on the ground. Such a measurement can range, for example, from about three feet to about twenty feet. Another compensation is due to a cable length from the radar altimeter to the one or more antennas, typically from about one foot to about thirty feet.

In addition, certain radar altimeter applications utilize a zero feet altitude indication when any of the wheels of the aircraft first touch a surface (i.e., an airport runway, an aircraft carrier deck) during landing. Other radar altimeter applications utilize a zero feet indication when the aircraft is at rest on the ground.

Every new aircraft application of known radar altimeters requires trained personnel, located in the field with the aircraft, to determine and adjust a zero altitude calibration when installing the radar altimeter system (i.e., the radar altimeter and associated antenna(s)) into the aircraft. Any installation changes with regard to the radar altimeter system following the above mentioned zero altitude calibration procedure may require repeating the zero altitude calibration procedure. In addition, normal day to day aircraft operations and maintenance may result in variations and inaccuracies in altitude readings provided by a radar altimeter. These variations and inaccuracies may be particularly noticeable when the aircraft is on the ground. Examples of such installation changes, operations, and maintenance include, but are not limited to, replacement of the tires, changes in cargo load weight, and radar altimeter antenna cable repair and replacement.

BRIEF DESCRIPTION OF THE INVENTION

In one aspect, a method for operating a radar altimeter to perform a zero altitude calibration is provided. The method comprises determining a difference between an altitude measured by the radar altimeter and a desired altitude indication and upon receiving a zero calibration command, subtracting the difference from an altitude output by the radar altimeter.

In another aspect, a radar altimeter is provided that comprises an altitude processing section configured to generate an uncompensated altitude based on a time delay between transmission and reception of radar signals. The radar altimeter further comprises an altitude error summing circuit configured to determine an error value and an altitude adjustment summing circuit configured to subtract the error value from the uncompensated altitude upon receipt of a zero altitude calibration command.

In still another aspect, an automatic zero altitude adjustment circuit for a radar altimeter is provided. The adjustment circuit comprises an altitude error summing circuit configured to determine an error value, the error value being a difference between a received altitude and a desired altitude indication. The circuit further comprises zero calibration logic configured to receive a zero calibration command and a zero calibration memory configured to store the error value from the altitude error summing circuit upon receipt of a command from the zero calibration logic. The automatic zero altitude adjustment circuit further comprises an altitude adjustment summing circuit configured to receive an uncompensated altitude generated by the radar altimeter and further configured to subtract the stored error value from the uncompensated altitude to generate a compensated altitude.

DETAILED DESCRIPTION OF THE INVENTION

Figure 1:
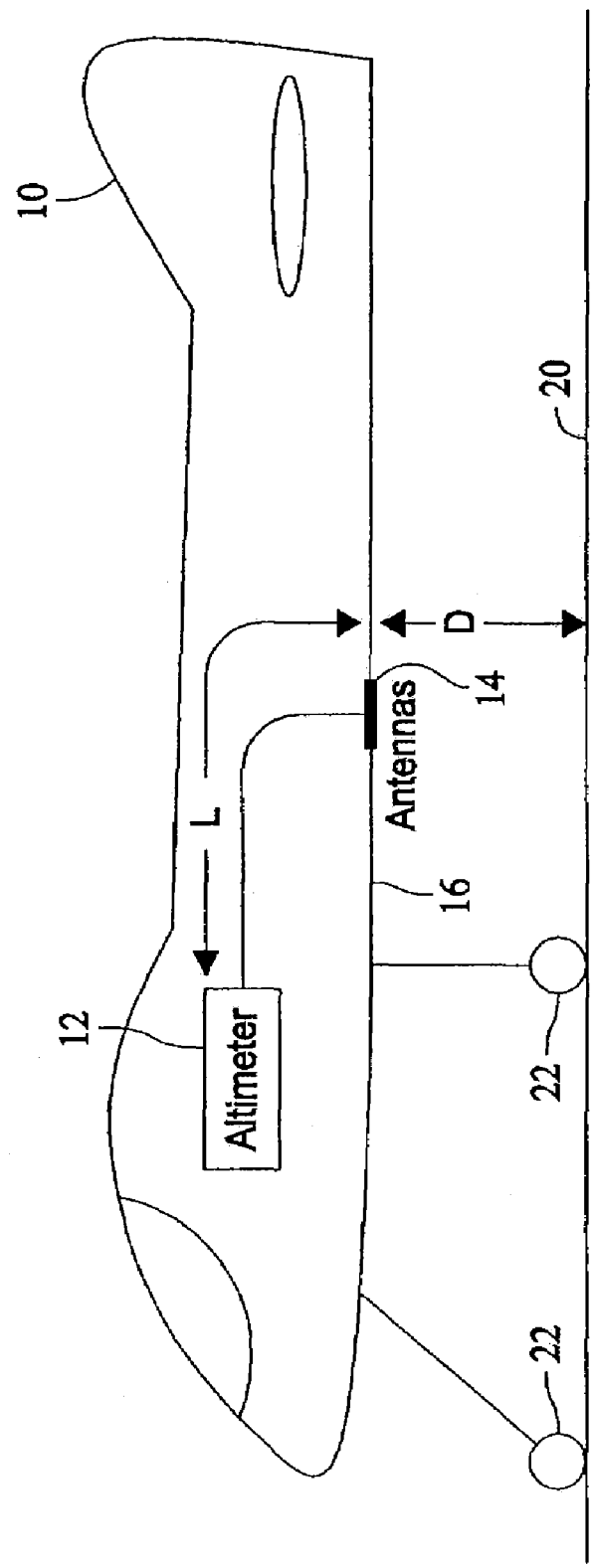
FIG. 1 is a diagram illustrating a typical radar altimeter installation within an air vehicle.

FIG. 1 is a diagram illustrating a typical radar altimeter installation within an air vehicle 10. Installed within aircraft 10 is a radar altimeter 12 which includes one or more antennas 14 that are mounted on a surface 16 of aircraft 10. Antennas 14 are a distance "L" from radar altimeter 12, and radar altimeters (e.g. radar altimeter 12) are typically calibrated to account for the delay in signal transmissions and receptions caused by the separation of radar altimeter 12 and antennas 14. Aircraft 10 is either parked on or taxiing along ground 20 as landing gears 22 are touching ground 20. As illustrated by FIG. 1, although aircraft 10 has a zero altitude (e.g., aircraft is on ground 20), antennas 14 of radar altimeter 12 are a distance "D" from ground 20. Absent any type of calibration, radar altimeter 12 will output an altitude reading of "D", assuming the distance "L" has been previously taken into account, even though aircraft 10 is on ground 20. Although "D" varies with the type of aircraft in which radar altimeter 12 and antennas 14 are installed, an example range for "D" would be three to twenty feet. Installation changes or routing changes affecting either radar altimeter 12 or one or more of antennas 14 can affect the radar delay "L" due to cable length between radar altimeter 12 and the respective antenna 14. Loaded weight changes of aircraft 10 due to changing fuel load, an amount of cargo, or number of passengers may also affect the radar signal delay between antenna 14 and ground 20, by changing the distance "D". Replacement of landing gear 22 or tires 24 may also affect the radar signal delay between antenna 14 and ground 20, by changing the distance "D".

Figure 2:
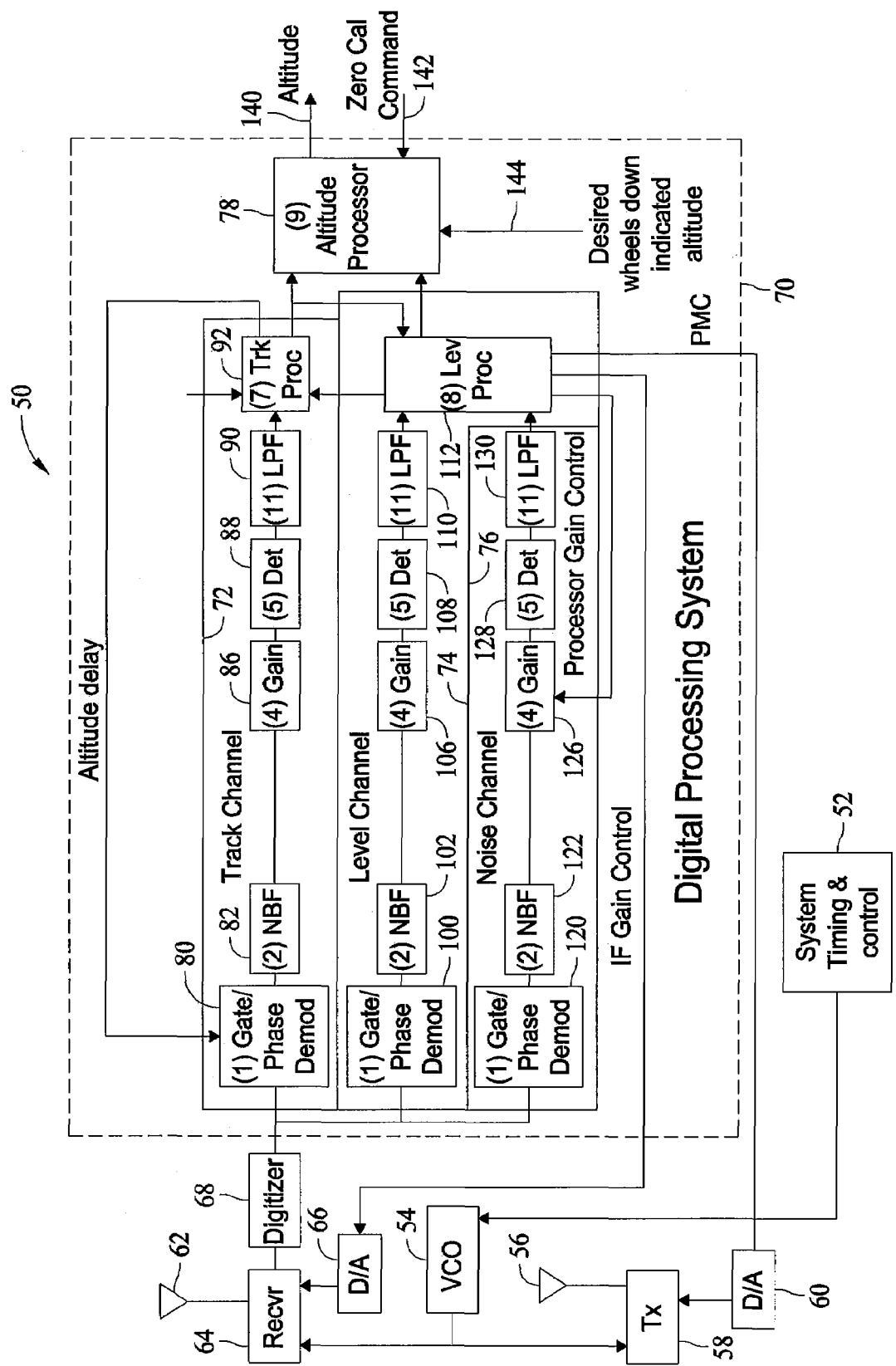
FIG. 2 is a functional block diagram of a radar altimeter having an altitude processor configured to receive a zero calibration command.

FIG. 2 is a functional block diagram of a radar altimeter 50 configured to receive a zero calibration command. In a preferred embodiment, radar altimeter 50 is incorporated in air vehicle 10 (shown in FIG. 1). Radar altimeter 50 includes system timing and control 52, voltage controlled oscillator 54, transmit antenna 56, transmitter 58, transmitter D/A converter 60, receive antenna 62, receiver 64, receiver D/A converter 66, digitizer 68, and digital processing system 70.

Transmitter 58 transmits pulses of modulated RF energy through antenna 56. The output power of transmitter 58 is controlled in a closed loop fashion by digital processing system 70 utilizing transmitter D/A converter 60. In one embodiment, the output power of transmitter 58 is minimized by digital processing system 70 for low probability of detection by enemy detectors.

Receive antenna 62 receives radar signals reflected from the ground. The received signals are amplified, mixed down to an intermediate frequency, and band limited by receiver 64. Digitizer 68 digitizes the signal from receiver 64 and outputs digitized samples of the signals received by radar altimeter 50 to digital processing system 70.

Digital processing system 70 includes a track processing circuit 72, a level processing circuit 74, and a noise processing circuit 76, each receiving digitized samples of the signals received from digitizer 68. Digital processing system 70 further includes an altitude processor 78. Track processing circuit 72 includes a gate/phase demodulator 80, a narrow band filter 82, an amplifier 86, a detector 88, a low pass filter 90 and a tracking processor 92. Track processing circuit 72 is sometimes referred to as a track channel.

Level processing circuit 74 includes a gate/phase demodulator 100, a narrow band filter 102, an amplifier 106, a detector 108, a low pass filter 110 and a level processor 112. Level processing circuit 74 is sometimes referred to as a level channel. Noise processing circuit 76 includes a gate/phase demodulator 120, a narrow band filter 122, an amplifier 126, a detector 128, and a low pass filter 130. An output of low pass filter 130 is input to level processor 112. Noise processing circuit 76 is sometimes referred to as a noise channel. In one embodiment, all of the components of digital processing system 70 are implemented in software executed by one or more microprocessors or digital signal processors, although discrete electronic hardware also could be utilized.

Radar altimeter 50, and more specifically, digital processing system 70, provide an indication of altitude, output by altitude processor 78, based on a measured time delay between transmission of radar signals from transmit antenna 56 and the processing of the received radar signals by digital processing system 70.

As illustrated in FIG. 2, digital processing system 70 outputs an altitude output 140, and receives a zero altitude calibration command 142, and a desired wheels down (e.g., tire(s) on ground) indicated altitude 144. A zero altitude calibration is performed anytime the zero altitude calibration command 142 is received by radar altimeter. In specific embodiments, zero altitude calibration command 142 is derived from one or more of logic (not shown) input to altitude processor 78 which senses one or more of wheels down (e.g., landing gear 22 in position for landing), and a low airspeed typical of airspeeds encountered only while aircraft 10 at rest or during taxi operations. In an alternative embodiment, the zero altitude calibration command 142 is periodic during the above described conditions. On receipt of zero altitude calibration command 142, radar altimeter 50 adjusts altitude output 140 to indicate zero feet. A correction value is added (subtracted) to an altitude that has been determined by radar altimeter 50 to cause altitude output 140 to indicate zero feet. The correction value is then stored in a memory (shown in FIG. 3) providing for a continuous correction of altitude output 140 until the next zero altitude calibration command 142 is received, when the process begins again.

Figure 3:
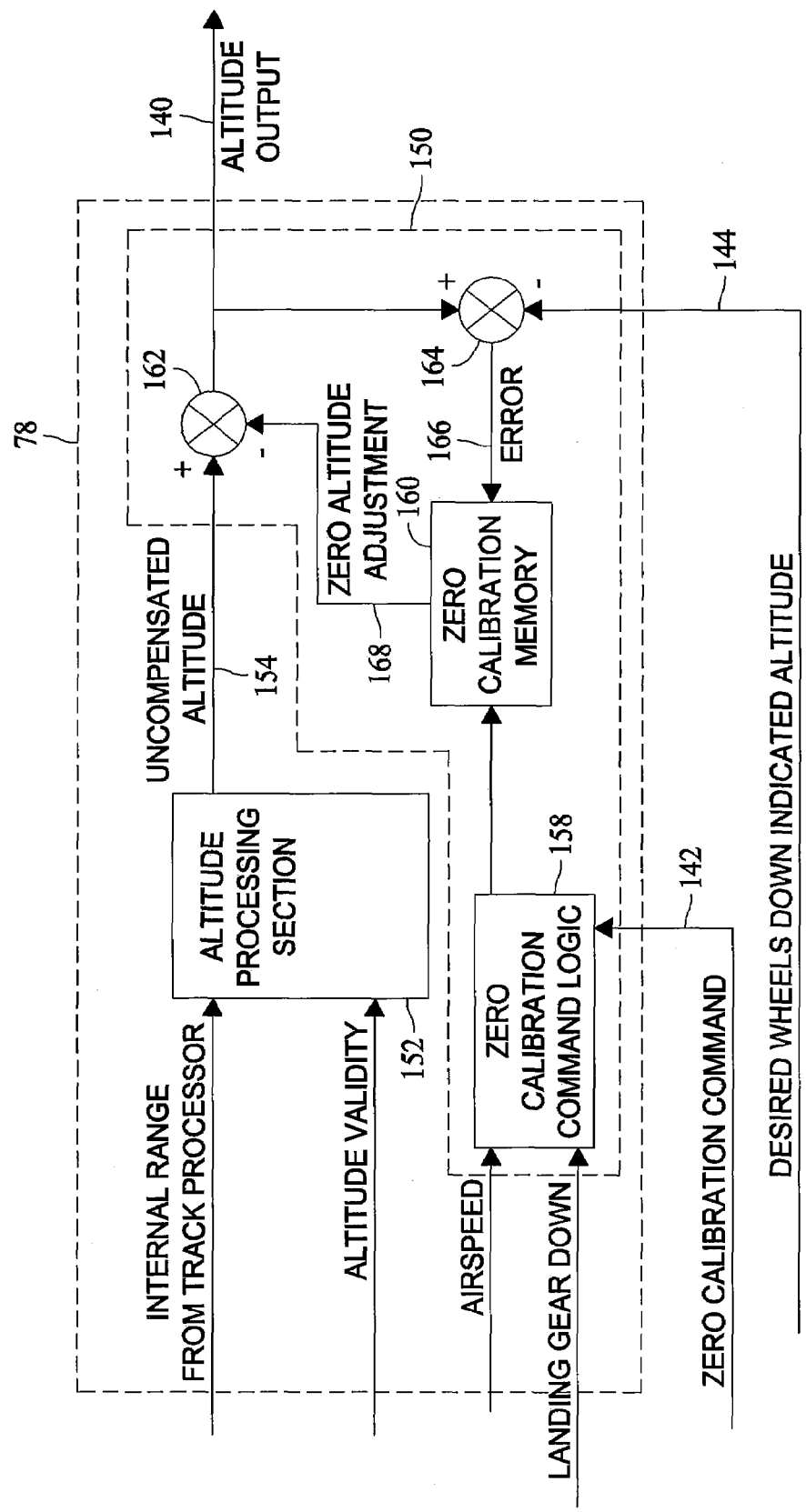
FIG. 3 is a functional block diagram of the altitude processor of FIG. 2.

FIG. 3 is a functional block diagram of altitude processor 78 (also shown in FIG. 2) which includes an automatic zero altitude adjustment circuit 150. Altitude processor 78 includes an altitude processing section 152 programmed to generate an uncompensated altitude 154 from measured radar time delay signals received from track processor 92 and level processor 112 (both shown in FIG. 2). Specifically, altitude processing section 152 receives internal range data from track processor 92 and an altitude validity signal is received from level processor 112.

Referring again to FIG. 3, automatic zero altitude adjustment circuit 150 includes zero calibration command logic 158, a zero calibration memory 160, an altitude adjustment summing circuit 162, and an altitude error summing circuit 164. Specifically, an error value 166 is generated by subtracting a desired wheels down indicated altitude 144 from altitude output 140. Desired wheels down indicated altitude 144 is sometimes referred to as a desired tires on ground reading, and in one embodiment, is stored within a user programmable memory (not shown) within radar altimeter 50. On receipt of zero calibration command 142 at zero calibration command logic 158, and depending on one or more of an airspeed and a landing gear down indication, error value 166 is stored in zero calibration memory 160. Error value 166 is utilized as a zero altitude adjustment 168 which is subsequently subtracted from uncompensated altitude 154, setting altitude output 140 at the desired on ground altitude. In most embodiments, desired wheels down indicated altitude 144 would be zero feet, however in some embodiments, it is desirable to indicate, for example, a negative altitude such as negative two feet such that altitude output 140 indicates a zero altitude (0 feet) just as the wheels touch or leave the ground on landing or take-off. In one example, the negative two feet could be attributable to the flexing of landing gears as the full weight of aircraft 10 bears down on the landing gears upon landing.

In one embodiment, the landing gear down indication and airspeed are inputs into altitude processor 78. Such signals may be derived external to radar altimeter 50. In the embodiment shown, landing gear down indication and airspeed are shown as input signals to zero calibration command logic 158 and indicate, respectively, that wheels (e.g., landing gear 22) are down for a landing (or takeoff), and whether the airspeed is low enough to be indicative of an airspeed typically encountered only while aircraft 10 is on the ground at rest or during taxi operations.

Operation of automatic zero altitude adjustment circuit 150 is further illustrated by a numerical example. Referring to FIG. 1, an example distance between antennas 14 and ground 20 is five feet and indicated as such by altitude output 140. For this condition, desired wheels down indicated altitude 144 is zero feet and is received from an external source, for example, from the cockpit controls and set by a pilot or by maintenance personnel. The difference between altitude output 140 (five feet) and desired wheels down indicated altitude 144 (zero feet), which is error value 166 (five feet), is stored within zero calibration memory 160. When zero calibration command 142 is received, a zero altitude adjustment 168 of five feet from zero calibration memory 160 is subtracted from uncompensated altitude 154, resulting in an altitude output 140 of zero feet.

To further illustrate the example, aircraft 10 is subsequently loaded with fuel and cargo, causing the distance between antennas 14 and ground 20 to be reduced to three feet. Based on the previous zero calibration, altitude output 140 would now indicate an altitude of negative two feet. The difference between altitude output 140 (negative two feet) and desired wheels down indicated altitude 144 (zero feet), is error value 166 (negative two feet), which is stored within zero calibration memory 160. Upon receipt of a subsequent zero calibration command 142, zero altitude adjustment 168 from zero calibration memory 160 is again subtracted (added since negative) from uncompensated altitude 154, resulting in an altitude output 140 of zero feet.

While the invention has been described in terms of various specific embodiments, those skilled in the art will recognize that the invention can be practiced with modification within the spirit and scope of the claims.

What is claimed is:

1. A method for operating a radar altimeter to perform an altitude calibration, said method comprising:
   receiving at least one signal indicative of a desired wheels down indicated altitude;
   determining a difference between an altitude measured by the radar altimeter and the desired wheels down indicated altitude; and
   upon receiving a zero calibration command, subtracting the determined difference from an altitude output by the radar altimeter.

2. A method according to claim 1 further comprising storing the difference in a memory as an altitude error.

3. A method according to claim 1 further comprising storing the difference in a memory as an altitude error upon receipt of the zero calibration command.

4. A method according to claim 1 further comprising subtracting the difference from subsequent altitude outputs until another zero calibration command is received.

5. A method according to claim 4 wherein subtracting the difference from subsequent altitude outputs comprises:
   storing the difference in a memory as an altitude error;
   accessing the memory to retrieve the altitude error; and
   subtracting the altitude error from the altitude output by the radar altimeter.

6. A method according to claim 1 further comprising verifying conditions exist for calibrating the altitude indication.

7. A method according to claim 6 wherein verifying conditions exist comprises verifying a landing gear is down when the zero calibration command is received.

8. A method according to claim 6 wherein verifying conditions exist comprises verifying that an airspeed of the vehicle is below a threshold value when the zero calibration command is received.

9. A method according to claim 1 wherein receiving a zero calibration command comprises periodically receiving the zero calibration command when at least one of landing gear is down and an airspeed of the vehicle is below a threshold value.

10. A radar altimeter, comprising:
    an altitude processing section configured to generate an uncompensated altitude based on a time delay between transmission and reception of radar signals;
    an altitude error summing circuit configured to determine an error value between the uncompensated altitude and a desired wheels down indicated altitude; and
    an altitude adjustment summing circuit configured to subtract the error value from the uncompensated altitude upon receipt of an altitude calibration command.

11. A radar altimeter according to claim 10 wherein the desired wheels down indicated altitude is indicative of a desired altitude output based on a condition of the vehicle in which said radar altimeter is installed.

12. A radar altimeter according to claim 10 further comprising a zero calibration memory, said memory configured to store the error value from said altitude error summing circuit.

13. A radar altimeter according to claim 12 further comprising zero calibration command logic, said logic configured to receive the altitude calibration command and enable said memory to output the error value to said altitude adjustment summing circuit upon receipt of the altitude calibration command by said logic.

14. A radar altimeter according to claim 13 configured to periodically update the error value based on a condition of the vehicle in which said radar altimeter is installed.

15. A radar altimeter according to claim 10 configured to verify a landing gear of the vehicle is down when the altitude calibration command is received.

16. A radar altimeter according to claim 10 configured to verify that an airspeed of the vehicle is below a threshold value when the altitude calibration command is received.

17. An automatic altitude adjustment circuit for a radar altimeter, said adjustment circuit comprising:
    an altitude error summing circuit configured to determine an error value, the error value being a difference between a received radar altimeter altitude output and a desired wheels down indicated altitude;
    zero calibration logic configured to receive a zero calibration command;
    a zero calibration memory configured to store the error value from said altitude error summing circuit upon receipt of a command from said zero calibration logic; and
    an altitude adjustment summing circuit configured to receive an uncompensated altitude generated by the radar altimeter and further configured to subtract the stored error value from the uncompensated altitude to generate a compensated altitude.

18. An automatic zero altitude adjustment circuit according to claim 17 wherein said zero calibration memory is configured to output the stored error value upon receipt of the command from said zero calibration logic.

19. An automatic zero altitude adjustment circuit according to claim 17 wherein the compensated altitude is the radar altimeter altitude output.

20. An automatic zero altitude adjustment circuit according to claim 17 wherein the altitude output by said altitude adjustment summing circuit is the altitude received by said altitude error summing circuit.

21. An automatic zero altitude adjustment circuit according to claim 17 wherein said zero calibration logic is configured to verify a landing gear is down when the zero calibration command is received.

22. An automatic zero altitude adjustment circuit according to claim 17 wherein said zero calibration logic is configured to verify that an airspeed of the vehicle is below a threshold value when the zero calibration command is received.

23. An automatic zero altitude adjustment circuit according to claim 17 further comprising a memory to store the desired wheels down indicated altitude, said memory being user programmable.

* * * * *